(12) United States Patent
Battal

(10) Patent No.: US 11,497,208 B2
(45) Date of Patent: Nov. 15, 2022

(54) LOW FOAMING HIGH ELECTROLYTE COMPOSITIONS

(71) Applicant: NOURYON CHEMICALS INTERNATIONAL B.V., Arnhem (NL)

(72) Inventor: Turgut Battal, Stora Höga (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 388 days.

(21) Appl. No.: 15/781,198

(22) PCT Filed: Dec. 6, 2016

(86) PCT No.: PCT/EP2016/079811
§ 371 (c)(1),
(2) Date: Jun. 4, 2018

(87) PCT Pub. No.: WO2017/097727
PCT Pub. Date: Jun. 15, 2017

(65) Prior Publication Data
US 2018/0352809 A1 Dec. 13, 2018

(30) Foreign Application Priority Data

Dec. 9, 2015 (EP) .................................. 15198676

(51) Int. Cl.
*A01N 65/08* (2009.01)
*A01N 25/30* (2006.01)
*A01N 65/40* (2009.01)
*A01N 57/20* (2006.01)
*A01N 59/02* (2006.01)
*C05G 5/23* (2020.01)
*C05C 3/00* (2006.01)

(52) U.S. Cl.
CPC .............. *A01N 25/30* (2013.01); *A01N 57/20* (2013.01); *A01N 59/02* (2013.01); *C05G 5/23* (2020.02); *C05C 3/00* (2013.01); *Y02A 50/30* (2018.01)

(58) Field of Classification Search
CPC ........ A01N 25/30; A01N 57/20; A01N 59/02; C05G 5/23; Y02A 50/30; C05C 3/00
See application file for complete search history.

(56) References Cited

U.S. PATENT DOCUMENTS

| | | | | |
|---|---|---|---|---|
| 4,426,203 A * | 1/1984 | Abel | ................. | D06L 1/14 8/138 |
| 5,990,181 A * | 11/1999 | Spyropoulos | ...... | B01D 19/0404 8/581 |
| 6,537,960 B1 * | 3/2003 | Ruhr | ................. | C11D 1/83 510/195 |
| 8,673,816 B2 * | 3/2014 | Blease | ................. | A01N 25/30 504/206 |
| 2005/0170968 A1 * | 8/2005 | Berghaus | ................. | A01N 31/02 504/363 |
| 2006/0063678 A1 * | 3/2006 | Wright | ................. | A01N 25/30 504/206 |
| 2007/0179077 A1 * | 8/2007 | Formstone | ......... | B01D 19/0404 510/405 |
| 2008/0103047 A1 * | 5/2008 | Gioia | ................. | A01N 57/20 504/206 |
| 2008/0171658 A1 | 7/2008 | Dyllick-Brenzinger et al. | | |
| 2010/0113274 A1 | 5/2010 | Hemminghaus et al. | | |
| 2011/0111958 A1 * | 5/2011 | Zenon | ................. | A01N 57/20 504/127 |
| 2011/0294899 A1 * | 12/2011 | Lang | ................. | B01D 19/0404 514/674 |
| 2012/0231956 A1 * | 9/2012 | Rainbird | ................. | A01N 57/20 504/206 |
| 2014/0148371 A1 * | 5/2014 | Man | ................. | C11D 3/365 510/407 |

FOREIGN PATENT DOCUMENTS

| | | | | |
|---|---|---|---|---|
| EP | 1025757 A1 * | 8/2000 | ............ | A01N 25/02 |
| EP | 2 457 890 A1 | 5/2012 | | |
| RU | 2369093 C2 | 10/2009 | | |
| WO | 03/082009 A1 | 10/2003 | | |
| WO | 2005/089232 A2 | 9/2005 | | |
| WO | WO-2005089232 A2 * | 9/2005 | .......... | A01N 43/653 |
| WO | 2010069898 A1 | 6/2010 | | |
| WO | WO-2012154732 A1 * | 11/2012 | ............ | A01N 25/00 |

OTHER PUBLICATIONS

Ash, M., Handbook of Green Chemicals, 2004, p. 173 (Year: 2004).*
Robinson, Andrew P., Simpson, David M., and Johnson, William G. Weed Technology, 26(4) : 657-660 (Year: 2012).*
Dorph-Petersen, K. and Steenbjerg, F., Plant and Soil II/No. 3, Jul. 1950, pp. 283-300 (Year: 1950).*
Golob, et al. (Efficacy of a New Potassium Salt Formulation of Glyphosate (Roundup PROMAX) Compared to other Formulations of Glyphosate, Oct. 29, 2008 [online] [retrieved on Sep. 3, 2020], retrieved from the internet <URL: http://turf.wsu.edu/wp-content/uploads/2013/09/RupProMaxReport2008.pdf>) (Year: 2008).*
Sawicki, G. Colloids and Surfaces A: Physicochem. Eng. Aspects 263 (2005) 226-232 (Year: 2005).*
Buck et al. Integrated environmental assessment and management 7.4 (2011): 513-541 (Year: 2011).*
Moo-Young, M. and Kawase, Y. The Canadian Journal of Chemical Engineering 65.1 (1987): 113-118 (Year: 1987).*

(Continued)

*Primary Examiner* — Mina Haghighatian
*Assistant Examiner* — Janice Y Silverman
(74) *Attorney, Agent, or Firm* — Lorenz & Kopf, LLP

(57) ABSTRACT

Compositions are provided which i) consists essentially of a siloxane defoamer and an alkoxylated C4-10 alcohol, ii) are aqueous concentrates comprising composition i), an adjuvant, and an electrolyte, and iii) are aqueous formulations obtainable by diluting compositions ii). Furthermore the use of compositions i) and ii) for in the preparation of agricultural formulations iii) and the use of such formulations iii) to treat a field or plants.

9 Claims, No Drawings

(56) References Cited

OTHER PUBLICATIONS

Anonymous: "Berol 840",, Jan. 17, 2014 (Jan. 17, 2014), XP055673799, Retrieved from the Internet: URL:http://www.macler.com.br/arquivo/materiais/153_berol_840__ficha_tecnica.pdf. [retrieved on Mar. 4, 2020].
Hreczuch, W, et al. "2-Ethylhexanol Derivatives as Nonionic Surfactants: Synthesis and Properties", Journal of Surfactants and Detergents, Nov. 20, 2015, p. 155-164, vol. 19, No. 1, Springer Berlin, Germany.
European Search Report issued in the counterpart European Application No. 15198676.7 dated Feb. 29, 2016.
Notification of Transmittal of the International Search Report and the Written Opinion of the International Searching Authority, or the Declaration from the International Bureau of WIPO for International Application No. PCT/EP2016/079811 dated Feb. 1, 2017.
"Berol 840" Printed Nov. 26, 2020. Safety Data Sheet.
MOMENTIVE inventing possibilities; 2020; Safety Data Sheet; Version 3.0, pp. 1-12.

\* cited by examiner

LOW FOAMING HIGH ELECTROLYTE COMPOSITIONS

This application is a national stage filing under 35 U.S.C. § 371 of PCT/EP2016/079811, filed Dec. 6, 2016, which claims priority to European Patent Application No. 15198676.7 filed Dec. 9, 2015, the contents of which are each incorporated herein by reference in their entireties.

FIELD OF INVENTION

The present invention relates to compositions comprising specific defoamers and specific alkoxylated alcohols. Such mixtures can be used to make aqueous composition comprising a large amount of an electrolyte, hereinafter, a high electrolyte composition. Often such compositions comprise an adjuvant, such as alkylamidoalkylamine surfactants. Such compositions are frequently encountered in the agrochemical field wherein salts, such as fertilizers and/or herbicide salts, are dissolved in water and subsequent applied to treat fields or crop. Therefore, the high electrolyte compositions of the invention are preferably agrochemical compositions. Since the compositions are typically applied using a spraying technique, they are preferably sprayable agrochemical compositions. However, the compositions can also be used in other techniques such as fertigation. Suitably the aqueous compositions of the invention are solutions. It is noted that known compositions, even if a defoamer is comprised, still show too much foaming, already when manufacturing the compositions, but particularly in spray applications. Therefore there is a need for compositions having the same herbicidal efficacy, but showing less foaming.

Background and Problem Description

Foam can be defined as a dispersion of a gas in a liquid. The dispersion has roughly the same density as the gas. Whereas pure liquids form bubbles, foaming requires the presence of a surfactant to lower the surface tension of the liquid. Most surfactants do generate foams as they tend to reduce surface tension.

High electrolyte compositions are compositions often encountered in the agrochemical field wherein salts, such as fertilizers and herbicide salts, are typically used as an aqueous solution and/or dispersion, which is subsequent applied to treat fields or crop. Typically the compositions are sprayed.

The high electrolyte compositions often contain adjuvants to stabilize the formulations, prevent drift during spraying, increase the efficacy of the electrolyte, often with the purpose of creating a better working solution and a better distribution of the electrolyte when applied. Typically, the use of the adjuvant allows a lower dosing rate of the electrolyte.

Surface active compounds are conventionally used as adjuvants, for example to change droplet size during spraying, or in order to allow the electrolyte to adhere on the area where it is functional, for example in foliage fertilizers, sometimes referred to as micronutrients, or to change the epidermal layer of the leaf surface, for example to permit pesticide entry.

Pesticides, adjuvants and optionally further auxiliary ingredients are conventionally sold as concentrated formulations, pre-mixes, which are intended to be mixed and diluted with water prior to its end-use.

When diluting a concentrated formulation with water, particularly in the presence of adjuvants, foaming is always observed, which phenomenon is undesired. The foaming can lead to process and handling difficulties, for instance, due to foam-residue build up on the side of the containers that are used for the dilution process. Also the foam can lead to a lower than calculated amount of product being dissolved. To fight the foam formation in the dilution step, defoaming agents are often included to prevent foam formation completely or to keep the foaming at acceptable levels. Preferably they are introduced by incorporation in the concentrated compositions, since this also solves the foaming problem observed when making the concentrated formulations, particularly the concentrated formulations comprising the adjuvants, since they typically have surface active properties. So the use of defoaming agents is also useful to prevent such foaming in the concentrated formulations.

Silicon based defoamers are well known and often used for this purpose. Conventional silicone based defoamers contain a siloxane polymer, such as polydimethylpolysiloxanes, which may be provided as such or as polysiloxane treated particles, e.g. polysiloxane treated silica.

However, for high electrolyte compositions foaming problems appear despite the addition of defoamers, particularly silicone-based defoamers, and there is consequentially a need for adjuvant-containing high electrolyte compositions that can be provided in high concentration while exhibiting acceptable foaming behavior in the production step and the dilution step.

DESCRIPTION OF THE INVENTION

The inventors have surprisingly found that the above-mentioned problems can be at least partially solved by the inclusion of certain non-ionic surfactants in the high electrolyte comprising an adjuvant and a defoamer.

Hence in an aspect, the present invention relates to an aqueous composition comprising
a) that has a high electrolyte content
b) an adjuvant
c) specific defoamer;
d) specific alkoxylated alcohol, and
e) water,
as defined in the claims. Preferably said aqueous composition is a concentrated composition, meaning a product comprising less than 90% by weight (% w/w) of water. In an embodiment the composition comprises less than 75% w/w, in another embodiment less than 60% w/w of water, and in yet another embodiment less than 50% w/w of water.

It is noted that a composition with high electrolyte content herein is defined as being aqueous compositions comprising salts, that can dissociate into ions, in a concentration of 10-75% w/w, in an embodiment 15-70% w/w, in another embodiment 20-65% w/w, and yet another embodiment 30-65% w/w.

An adjuvant is a material added to aid or modify the action of an agrochemical, or the physical characteristics of the mixture. (ASTM Designation E 1519-95).

A defoamer, also known as anti-foaming agent, is a chemical additive that reduces and hinders the formation of foam in liquids. In an embodiment is it a conventional silicon-based defoamer, including siloxane polymers or siloxane-treated particles.

The present invention further relates to a blend of defoamer and alkoxylated alcohol, as well as a dilution of such a blend, which can be used to make said concentrated compositions.

The present invention also relates to agricultural formulations obtainable by combining the concentrated composition with a sufficient amount of water to yield an agrochemical formulation with the concentration of the high electrolyte and adjuvant that makes it suitable for end-use, i.e. for fertilizing or treating plants or seeds, preferably for fertilizing or treating plants.

The present invention also relates a method of treating a field or a plant or seed by distributing the composition of the invention over said field or contacting said plant or seed with a composition according to the invention, preferably a field or plant is treated.

A preferred electrolyte for use in accordance with the invention is a water-soluble fertilizer. Water-soluble fertilizers include but are not limited to water-soluble nitrates, phosphates, sulfates, chlorides, cyanamides, urea, and mixtures thereof. The major three elements are nitrogen, potassium and phosphorus, the secondary elements, also called micronutrients, are calcium, sulfur, magnesium, and other elements such as boron, manganese, iron, zinc, copper, silicium, and molybdenum. Fertilizers enhance the natural fertility of the soil or replace the chemical elements taken from the soil by harvesting, grazing, leaching or erosion. Suitable artificial fertilizers are inorganic fertilizers formulated in appropriate concentrations and combinations supply three main nutrients: nitrogen, phosphorus and potassium (N, P and K) for various crops and growing conditions. N (nitrogen) promotes leaf growth and forms proteins and chlorophyll. P (phosphorus) contributes to root, flower and fruit development. K (potassium) contributes to stem and root growth and the synthesis of proteins. The common inorganic fertilizers include ammonia (82% nitrogen), NPK combinations, urea (46% nitrogen), superphosphate, mono and dibasic ammonium phosphates (containing nitrogen and phosphate), calcium ammonium nitrate, potassium chloride (muriate of potash). In an embodiment the fertilizer is or comprises a salt selected from nitrates, phosphates, sulfates, particularly ammonium sulfate (AMS) and epson salt, chlorides, cyanamides such as calcium cyanamide, and mixtures thereof. In an embodiment the fertilizer is AMS. Some of these fertilizers may also show herbicidal activity, such as calciumcyanamide.

In another embodiment, the high electrolyte is a water-soluble herbicide in the salt form. Suitable herbicide salts are potassium N-(phosphonomethyl)glycinate and ammonium N-(phosphonomethyl)glycinate, also known as glyphosates, Paraquat, Dicamba, MCPP (mecoprop-P-potassium), dichlorprop-dimethylammonium, and dimethyldithiocarbamate salts, which are in salt form that will dissociate in water and then form high electrolyte systems. In an embodiment combinations of one or more water-soluble fertilizers, combinations of one or more herbicide salts, or combinations of one or more water-soluble fertilizers as well as one or more herbicide salts are used. Said water-soluble fertilizers and herbicides are commercially available from numerous commercial sources and/or can be produced by any method known to those skilled in the art.

The electrolyte is suitably present in a concentration of from 100 to 750 g/l of the electrolyte formulation. In a specific embodiment a herbicide salt is present in an amount of 200, 300, 350, or 400 up to 700, 650, or 600 g/l.

In an embodiment the invention also relates to compositions further comprising other herbicides, particularly herbicides that may also lead to a higher ionic strength in the formulation, such as phenoxy-acid-type herbicides, including a product such as 2,4-D (2,4-dichlorophenoxy acetic acid).

The adjuvant that is used in the compositions of the invention are selected from a large number of commercially available adjuvants. In an embodiment said adjuvant is a surfactant. In an embodiment it is selected from glucosides, such as AG6210, betaines, phosphate esters, quaternary ammonium-based surfactants, including ethoxylated quaternary ammonium-based surfactants. In yet another embodiment it is an amidoalkyl amine of the formula (I)

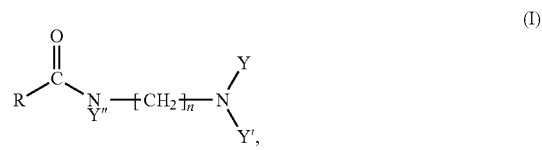

where
R is a straight or branched, saturated or unsaturated alkyl group having from 6, such as from 10, such as from 12, to 22, such as to 18, such as to 16 carbon atoms,
n is 2 or 3;
Y, Y' and Y" are each, independently, hydrogen, an alkyl group having from 1 to 4, preferably from 1 to 2, more preferably 1, carbon atoms or the group $(AO)_sH$, wherein AO is an alkyleneoxy group having 2-4, preferably 2 carbon atoms, and s is from 1-10, provided that at least one of the groups Y and Y' is an alkyl group having 1-4 carbon atoms; or a salt of the product of formula (I); or a quaternized derivative of (I), having formula (II)

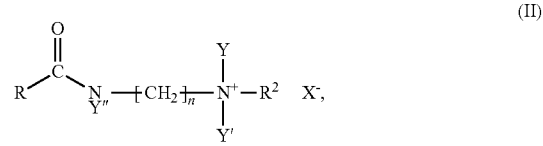

where R, n Y, Y', and Y" are as described for formula (I) above,
$R^2$ is a C1-C4-alkyl group, preferably methyl; and
$X^-$ is an anion, such as but not limited to $Cl^-$, $Br^-$, $I^-$, $H_2PO_4^-$ $H_3C-OSO_3^-$, $HCO_3^-$ and $H_3O-OCO_2^-$ Preferably both Y and Y' are methyl. Preferably Y" is hydrogen.

Specific examples of compounds of formula (I) useful in the context of the present invention include, but are not limited to N-[3-(dimethylamino)propyl] ($C_{8-10}$)amide, N-[3-(dimethylamino)propyl] cocoamide and N-[3-(dimethylamino)propyl] (rape-seed)amide.

The adjuvants are suitably used in an amount of from 20 to 200, in an embodiment from 30 to 150, in another embodiment from 50 to 100 g/l in the concentrated compositions.

Defoamers as used in accordance with the invention are siloxane polymers. Suitable defoamers are commercially available and include all conventional defoamers. Suitably it is a defoamer selected from the SAG products from Momentive Performance Chemicals, USA, the BC Antifoam products of KCC Brasilon, Foamaster of Cognis, Rhodisol of Rhodia, Break Thru of Degussa, and/or the Surfynol® DF series and the Airase® SSDL™ products of Air Products.

The defoamers are suitably used in an amount of from 0.01 to 10, in an embodiment from 0.05 to 1, in another embodiment from 0.1 to 0.5 g/l in the concentrated compositions.

The alkoxylated alcohol is a compound of formula (III)

$$R^3—O(AO)_m—H \quad (III)$$

wherein R3 is a C4-C12 alkyl group, AO is an alkyleneoxy group having from 2 to 4 carbon atoms, preferably 2, m is from 1 to 10, suitably from 2, 3, 4, or 5 up to 6, 7, 8, or 9. In an embodiment, R3 is an alkyl group with from 5, 6, 7, or 8 carbon atoms, up to 8, 9, 10, or 11 carbon atoms, whereby the alkyl group of R3 is preferably a branched alkyl group.

Specific examples of compounds of formula (III) useful in the context of the present invention include ethoxylates of 2-ethyl hexanol and 2-propyl heptanol (any isomer), for example products with 2, 3, 4, 5 or 6 moles of ethylene oxide per mole alcohol.

Alkoxylated alcohols of formula (III) are well known in the art and are commercially available or can be obtained by reacting the alcohol R3-OH with m moles of one or more $C_{2-4}$-alkyleneoxides per mole of alcohol, under alkoxylating reaction conditions well known to the persons skilled in the art and using a suitable catalyst. The alkoxylation can be blocky or random and any combination and order of alkoxylation steps is possible. In a suitable embodiment the alkoxylated alcohol contains ethoxy and/or propoxy groups.

The alkoxylated alcohols are suitably used in an amount of from 0.1 to 10 g/l, in an embodiment from 0.2 to 7.5 g/l, in another embodiment from 0.5 to 5 g/l, in the concentrated compositions.

Suitably a blend consisting essentially of the alkoxylated alcohol of formula III and siloxane defoamer is used to prepare the concentrated compositions. The blends suitably have a composition wherein the weight ratio of alkoxylated alcohol to defoamer is from 0.1:10 to 10:0.01. The term "consisting essentially of" means here that the blend comprises more than 90 percent by weight of the alkoxylated alcohol of formula III and siloxane defoamer. Suitably the term "consisting essentially of" is used to identify blends comprising more than 92, 94, 96, or 98 percent by weight of the alkoxylated alcohol of formula III and siloxane defoamer. In an embodiment the term "consisting essentially of" is used to denominate blends of just alkoxylated alcohol of formula III and siloxane defoamer comprising some traces of contaminants. Said blend can be mixed with water and/or alcohols (including ether alcohols and diols) having up to 4 carbon atoms, in an embodiment up to 3 carbon atoms, to facilitate its handling. In an embodiment the amount of water and/or alcohols is less than 50% w/w of the composition.

Suitably a blend of alkoxylated alcohols and adjuvants is made and used to reduce shipping and handling costs.

The composition of the present invention is preferably obtained by pre-mixing the defoamer, the alkoxylated alcohol and the adjuvant, more preferably by mixing the defoamer and the alkoxylated alcohol, followed by addition of the adjuvant, and thereafter adding the premix to an aqueous solution of the electrolyte, followed by the optional addition of further amounts of water and possibly further (auxiliary) ingredients.

In one aspect, the present invention relates to a concentrated composition, i.e. a composition which is intended to be diluted with water to a ready-to-use formulation, comprising
  from 100 to 750 g/l of electrolyte (a);
  from 20 to 200, preferably from 50 to 100 g/l of one or more adjuvants (b);
  from 0.01 to 10, preferably from 0.05 to 1, more preferably 0.1 to 0.5 g/l of one or more defoamers (c);
  from 0.1 to 10, preferably from 0.5 to 5 g/l of one or more alkoxylated alcohols of formula III (d); and
  water up to a total of 1 liter.

The basis for the above-mentioned concentrations is the weight of active ingredients and the total volume of the composition. For the defoamer (c), the active content is taken as the weight of the siloxane polymer.

Preferably the composition is a liquid.

In another aspect the present invention relates to a method of preparing an agrochemical formulation comprising combining the above-described concentrated composition with a sufficient amount of an aqueous medium to obtain the electrolyte-containing formulation which is suitable for being used, i.e. applied to fields or plants. The aqueous medium is preferably water, for example tap water or rain water, and can further comprise auxiliary ingredients, different or equal to the compounds in the composition.

However, the aqueous agrochemical formulation can also be produced directly from the individual components, or any other (partial) pre-blend thereof.

Depending on the intended way of application of the agrochemical formulation, the electrolyte concentration may differ, but is generally in the range of from 0.1 to 10, more preferably from 0.5 to 6, even more preferably from 1 to 5 g/l, the amount of electrolyte being calculated as pure electrolyte. For crop field spray applications, a conventionally used total spray rate is 200 litres/hectar, and the typical recommended treat rate of electrolyte is from 1 to 5 kg electrolyte/ha, resulting in a preferred electrolyte concentration in the agrochemical formulation of from 0.5 to 2.5 wt % (5 to 25 g/l), expressed as the weight of the electrolyte in the spray solution.

Typically, the concentrated composition is diluted with the aqueous medium at a volume ratio of 0.1:99.9 to 10:90, preferably 1:99 to 5:95 (concentrated composition:aqueous medium) in order to form the ready-to-use agrochemical formulation.

The concentrations of the different ingredients in the concentrated composition are preferably such that (i) the concentrated composition is a liquid formulation that easily can be diluted with water to form the agrochemical ready-to-use formulation, while having an as small as possible volume for transportation and storage purposes, and (ii) that the agrochemical ready-to-use formulation contains the suitable amount of the various ingredients.

In yet another aspect, the present invention relates to the agrochemical formulation obtainable by combining the above-describe concentrated composition with water as described above.

In a further aspect, the present invention relate to a method of treating a plant or seeds, comprising the step of contacting a part of the plant or seeds with a composition or agrochemical formulation of the invention, at an amount sufficient of high electrolyte for obtaining an agrochemical effect on the plant or seed. Preferably, the step of contacting a plant or seed with the agrochemical formulation involves spraying the agrochemical formulation onto the plant or seed.

The invention will now be further illustrated with reference in the following example which is provided for illustrative purposes only.

Material and Methods

SAG 1572 defoamer was supplied by Momentive USA, (provided as 15% active).

Berol 840 alkoxylated alcohol=2-ethylhexanol+4 EO (2-EH+4EO) provided by Akzo Nobel, Sweden.

AG6210 adjuvant=2EH glucoside provided by Akzo Nobel, Sweden.

Adsee C80W adjuvant=N-[3-(dimethylamino)propyl] cocoamide (Coco-APA) supplied by AkzoNobel Surface Chemistry, Sweden (provided as 80% active)

The K-glyphosate used in the examples was diluted with water to 540 g acid equivalents/L (54%) before further steps took place. The product was supplied as a 663 g/L K-glyphosate (concentration based on K-salt) by Barclay Chemicals, Ireland.

Procedure

1. Start with the silicone based defoamer
2. Add 2EH+4EO and stir
3. Add Coco-APA and stir until homogenous
4. Add the electrolyte and water if needed. Mix and apply gentle heating (40° C.) if needed.

The foaming behaviors was evaluated by diluting 1.5 ml of the blends mentioned in the table in 48.5 ml of CIPAC Standard water D (see test protocol CIPAC MT 18) which has a hardness of 342 mg/L calculated as calcium carbonate and adding this to a 100 ml graduated cylinder. The cylinder was inverted 30 times and the total ml content in the cylinder including foam as function of time was recorded, as specified in test protocol CIPAC MT 47.1. The results are shown in Table 1 below These results show that for high electrolyte compositions, the combination of an alkoxylated alcohol and a silicon-based defoamer has better foaming properties, i.e. better antifoaming, even when used in a small amount, compared to compositions that do not contain an alkoxylated alcohol.

Examples 4-6

Examples 1, 2, and 3, were repeated using the reaction product of 2-propyl heptanol (2PH, a mixture of isomers ex BASF) with 8 moles of EO per mole of alcohol instead of the Berol 840. Also the 2PH 8EO showed the synergistic lowering of foam of the aqueous high electrolyte formulation when used in combination with the siloxane. However, the results obtained in examples 1-3 were slightly better, favoring the use to the 2EH ethoxylates over the 2PH ethoxylates. Based on these results, the higher ethoxylated alcohols, such as tridecyl alkoxylates, will not have the desired synergistic behavior with the siloxane defoamers.

Example I

An example was repeated except that the alkoxylated alcohol was used alone, without the siloxane, in a high electrolyte formulation of K-glyphosate and Adsee C80W.

TABLE 1

Foaming results.

| Example | Blend | Amount blend [g] | Water [g] | Addition level blend | Foam height [ml] | | | | |
|---|---|---|---|---|---|---|---|---|---|
| | | | | | 10 sec | 1 min | 5 min | 10 min | 60 min |
| A | 7% AG6210, 92.9% K-glyphosate (54%), 0.1% SAG1572 | 1.50 | 48.5 | 3.0% | 67 | 51 | 12.5 | 7 | 2.5 |
| B | 7% AG6210, 92.4% K-glyphosate (54%), 0.1% SAG1572, 0.5% Berol 840 | 1.52 | 48.5 | 3.0% | 71 | 55 | 14 | 7 | 1.5 |
| C | 7% Adsee C80W, 93% AMS (40%) | 1.52 | 48.5 | 3.0% | 93 | 80 | 77 | 77 | 63 |
| D | 7% Adsee C80W, 92.9% AMS (40%), 0.1% SAG1572 | 1.52 | 48.5 | 3.0% | 70 | Foam sticks to glass | | | 0 |
| 1 | 7% Adsee C80W, 93% AMS (40%), 0.1% SAG1572, 0.5% Berol 840 | 1.52 | 48.5 | 3.0% | 78 | 28 | 3 | 2 | 0 |
| E | 7% AG6210, 93% K-glyphosate (54%) | 0.50 | 49.5 | 1.0% | 60 | 50 | 47 | 46 | 44 |
| F | 7% AG6210, 92.9% K-glyphosate (54%), 0.1% SAG1572 | 0.50 | 49.5 | 1.0% | 52 | 28 | 12.5 | 10 | 4 |
| 2 | 7% AG6210, 92.4% K-glyphosate (54%), 0.1% SAG1572, 0.5% Berol 840 | 0.50 | 49.5 | 1.0% | 44 | 4.5 | Very little foam sticks to glass | | 0 |
| G | 7% Adsee C80W, 93% AMS (40%) | 0.50 | 49.5 | 1.0% | 71 | 68 | 64 | 62 | 55 |
| H | 7% Adsee C80W, 92.9% AMS (40%), 0.1% SAG1572 | 0.50 | 49.5 | 1.0% | 64 | 43 | 15 | 10 | 3 |
| 3 | 7% Adsee C80W, 92.4% AMS (40%), 0.1% SAG1572, 0.5% Berol 840 | 0.50 | 49.0 | 1.0% | 71 | 52 | 20 | 12 | 2.5 |

| Example | Blend | Amount (g) | Water (g) | Addition level blend | Foam height | | | | |
|---|---|---|---|---|---|---|---|---|---|
| | | | | | 10 sec | 1 min | 5 min | 10 min | 60 min |
| I | 7% Adsee C80W, 92.5% K-glyphosate, 0.5 Berol 840 | 1.5 | 48.5 | 3.00% | 65 | 60 | 55 | 38 | 38 |

The results show that the use of the alkoxylated alcohol without the siloxane defoamer leads to too much foam.

What is claimed is:

1. An aqueous agricultural composition having minimized foam for use in treating fields and/or crops, said composition consisting of:
   N-[3-(dimethylamino)propyl] cocoamide) in an amount of from about 5 to 6 weight percent actives;
   ammonium sulfate present in an amount of about 37 weight percent actives;
   a polydimethylsiloxane antifoam emulsion present in an amount of about 0.15 weight percent actives;
   2-ethylhexanol ethoxylated with about 4 moles of ethylene oxide and/or 2-propyl heptanol ethoxylated with about 8 moles of ethylene oxide, present in a total amount of about 0.5 weight percent actives; and
   water,
   wherein the total weight percent actives of the N-[3-(dimethylamino)propyl] cocoamide), the ammonium sulfate, the emulsion, and the ethoxylated alcohol(s) is about 3 weight percent and the total weight percent of the water is about 97 weight percent.

2. The composition of claim 1, wherein the 2-ethylhexanol ethoxylated with about 4 moles of ethylene oxide is present in about 0.5 weight percent actives and the composition is free of the 2-propyl heptanol ethoxylated with about 8 moles of ethylene oxide.

3. The composition of claim 1 wherein the 2-propyl heptanol ethoxylated with about 8 moles of ethylene oxide is present in about 0.5 weight percent actives and the composition is free of the 2-ethylhexanol ethoxylated with about 4 moles of ethylene oxide.

4. An aqueous agricultural composition having minimized foam for use in treating fields and/or crops, said composition consisting of:
   N-[3-(dimethylamino)propyl] cocoamide) in an amount of from about 5 to 6 weight percent actives;
   ammonium sulfate present in an amount of about 37 weight percent actives;
   a polydimethylsiloxane antifoam emulsion present in an amount of about 0.15 weight percent actives;
   2-ethylhexanol ethoxylated with about 4 moles of ethylene oxide and/or 2-propyl heptanol ethoxylated with about 8 moles of ethylene oxide, present in a total amount of about 0.5 weight percent actives; and
   water,
   wherein the total weight percent actives of the N-[3-(dimethylamino)propyl] cocoamide), the ammonium sulfate, the emulsion, and the ethoxylated alcohol(s) is about 1 weight percent and the total weight percent of the water is about 99 weight percent.

5. The composition of claim 4 wherein the 2-ethylhexanol ethoxylated with about 4 moles of ethylene oxide is present in about 0.5 weight percent actives and the composition is free of the 2-propyl heptanol ethoxylated with about 8 moles of ethylene oxide.

6. The composition of claim 4 wherein the 2-propyl heptanol ethoxylated with about 8 moles of ethylene oxide is present in about 0.5 weight percent actives and the composition is free of the 2-ethylhexanol ethoxylated with about 4 moles of ethylene oxide.

7. An aqueous agricultural composition having minimized foam for use in treating fields and/or crops, said composition consisting of:
   2-ethyl hexyl glucoside present in an amount of about 7 weight percent actives;
   K-Glyphosate present in an amount of about 50 weight percent actives;
   a polydimethylsiloxane antifoam emulsion present in an amount of about 0.15 weight percent actives;
   2-ethylhexanol ethoxylated with about 4 moles of ethylene oxide and/or 2-propyl heptanol ethoxylated with about 8 moles of ethylene oxide, present in a total amount of about 0.5 weight percent actives;
   wherein the total weight percent actives of the 2-ethyl hexyl glucoside, the K-glyphosate, the emulsion, and the ethoxylated alcohol(s) is about 1 weight percent and the total weight percent of the water is about 99 weight percent.

8. The composition of claim 7 wherein the 2-ethylhexanol ethoxylated with about 4 moles of ethylene oxide is present in about 0.5 weight percent actives and the composition is free of the 2-propyl heptanol ethoxylated with about 8 moles of ethylene oxide.

9. The composition of claim 7 wherein the 2-propyl heptanol ethoxylated with about 8 moles of ethylene oxide is present in about 0.5 weight percent actives and the composition is free of the 2-ethylhexanol ethoxylated with about 4 moles of ethylene oxide.

\* \* \* \* \*